(12) United States Patent
Savioz

(10) Patent No.: US 11,026,541 B2
(45) Date of Patent: *Jun. 8, 2021

(54) DISPOSABLE HEAT TRANSFER DEVICE AND SYSTEM INTEGRATING SUCH A DEVICE

(71) Applicant: NESTEC S.A., Vevey (CH)

(72) Inventor: Gregory Savioz, Saxonne (CH)

(73) Assignee: Societe des Produits Nestle S.A., Vevey (CH)

( * ) Notice: Subject to any disclaimer, the term of this patent is extended or adjusted under 35 U.S.C. 154(b) by 537 days.

This patent is subject to a terminal disclaimer.

(21) Appl. No.: 15/538,771

(22) PCT Filed: Dec. 14, 2015

(86) PCT No.: PCT/EP2015/079532
§ 371 (c)(1),
(2) Date: Jun. 22, 2017

(87) PCT Pub. No.: WO2016/102218
PCT Pub. Date: Jun. 30, 2016

(65) Prior Publication Data
US 2017/0367527 A1    Dec. 28, 2017

(30) Foreign Application Priority Data
Dec. 24, 2014    (EP) .................................. 14200274

(51) Int. Cl.
*A47J 31/54*    (2006.01)
*A47J 31/40*    (2006.01)

(52) U.S. Cl.
CPC ........... *A47J 31/542* (2013.01); *A47J 31/407* (2013.01)

(58) Field of Classification Search
CPC .............. A47J 27/21016; A47J 31/4489; A47J 31/542; F22B 1/282; F22B 1/28
USPC .. 99/295, 302 R, 288, 290, 291, 323.3, 275, 99/280, 285, 286, 287, 289 P, 289 R, 293, 99/307, 323.1, 330, 342, 403, 453, 484,
(Continued)

(56) References Cited

U.S. PATENT DOCUMENTS 6,459,854 B1 * 10/2002 Yoakim ................... F24H 1/142
  392/479
9,980,601 B2 * 5/2018 Feijen .................... A47J 43/121
(Continued)

FOREIGN PATENT DOCUMENTS

CN    101282671 A    10/2008
CN    103827621 A    5/2014
(Continued)

OTHER PUBLICATIONS

European Office Action for Patent Appl No. 15 813 755.4-1004 dated Sep. 11, 2020.

*Primary Examiner* — Tu B Hoang
*Assistant Examiner* — Vy T Nguyen
(74) *Attorney, Agent, or Firm* — K&L Gates LLP

(57) ABSTRACT

The invention relates to a disposable heat transfer device (10) for heating a fluid or a fluid foam on demand comprising a path (30) through which the fluid or the fluid foam circulates and at least one layer (11) made of a thermally conductive material, the path (30) being in contact with the layer (11) in such a way that when the layer (11) is heated it transmits heat to the fluid or fluid foam as it circulates through the path (30).

2 Claims, 6 Drawing Sheets

(58) Field of Classification Search
USPC .......... 99/516; 426/474, 115, 431, 231, 477,
426/523, 580, 590, 593, 594, 596;
392/479, 485, 449, 451; 222/153.06, 165,
222/185.1, 325, 333, 404, 71; 239/271,
239/309, 315, 316, 318; 210/181, 184,
210/259, 416.3, 97; 165/167, 80.4
See application file for complete search history.

(56) References Cited

U.S. PATENT DOCUMENTS

2009/0269044 A1* 10/2009 Yamakawa ............. F24H 1/142
392/488
2014/0322418 A1* 10/2014 Cowe ...................... A47J 27/10
426/523
2015/0289710 A1* 10/2015 van Druten ......... B01F 3/04248
426/115

FOREIGN PATENT DOCUMENTS

| | | |
|---|---|---|
| DE | 3637378 | 5/1988 |
| WO | 2011006291 | 1/2011 |
| WO | 2013170887 | 11/2013 |
| WO | 2013175475 | 11/2013 |
| WO | 2014077692 A2 | 5/2014 |
| WO | 2014088233 A1 | 6/2014 |
| WO | 2014096181 A1 | 6/2014 |
| WO | 2014195842 | 12/2014 |

* cited by examiner

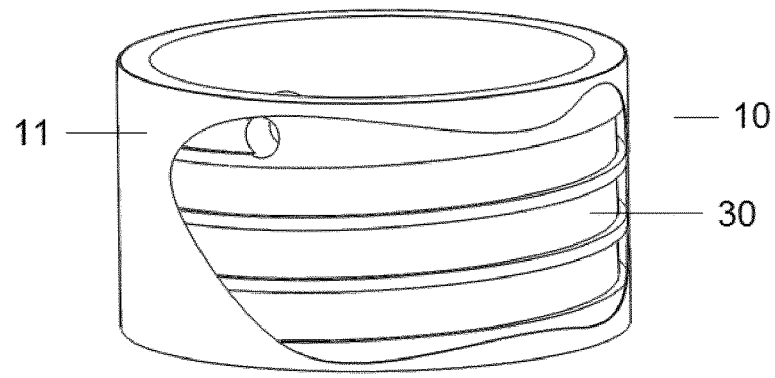
FIG. 7a
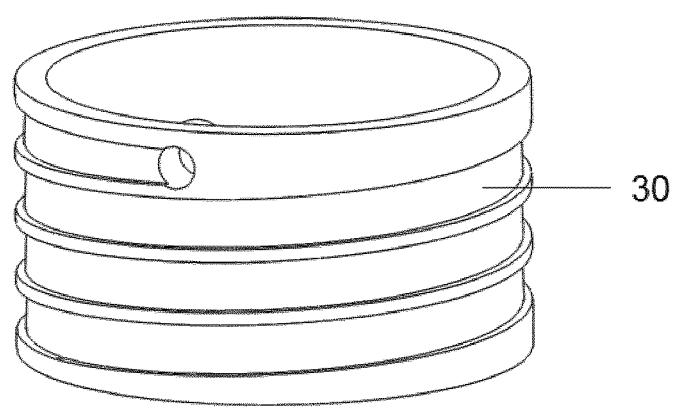
FIG. 7b
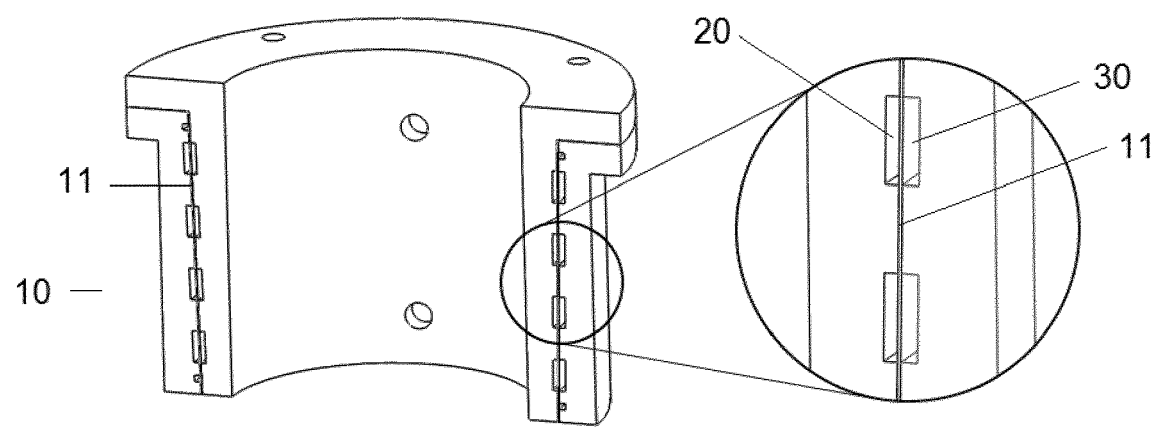
FIG. 8a
FIG. 8b

DISPOSABLE HEAT TRANSFER DEVICE AND SYSTEM INTEGRATING SUCH A DEVICE

CROSS REFERENCE TO RELATED APPLICATIONS

The present application is a National Stage of International Application No. PCT/EP2015/079532, filed on Dec. 14, 2015, which claims priority to European Patent Application No. 14200274.0, filed on Dec. 24, 2014, the entire contents of which are being incorporated herein by reference.

FIELD OF THE INVENTION

The present invention is directed to a disposable heat transfer device for heating fluids or fluid foams in an efficient and clean way and also to a system integrating such a disposable heat transfer device.

BACKGROUND OF THE INVENTION

Fluid foams consist of two phases, an aqueous phase and a gaseous (air) phase. A fluid foam is a substance which is formed by trapping many gas bubbles in a fluid structure: producing a fluid foam involves not only the generation of these gas bubbles, but also the packing and the retention of these bubbles into the overall fluid structure in order to provide a stable foam.

Nowadays, there exists the trend of consuming a wider variety of coffee types, most of them containing considerably more milk than before. These new coffee types comprise very often milk foams, so providing good quality foam which is stable for a long time is a present need. As a consequence, there is a strong need for a foam heating technology, particularly for a milk foam heating technology for a wide range of businesses, particularly involving beverage preparations. As for now, no cleaning solution exists and the consumer always has to clean part of the machine which becomes a hassle when milk is involved: because milk deteriorates rapidly with time the system needs to be thoroughly cleaned very often, preferably after each use. Superior quality milk foam is also more and more required and the heating system has to be smartly designed so as not to decrease the foam quality and provide a superior in cup result.

At present, there exist current systems which are able to provide superior quality milk foam: this milk foam is generated from cold milk and is then heated up at a later stage so that the creamy texture is kept stable for a longer period of time: this entrains the difficulty of being able to heat up the foam without degrading its texture. There are different ways of heating up cold milk foam known in the state of the art. Some use a heat transfer device, such as for example a thermobloc, which heats the milk foam once it has been produced. The problem of using such heat transfer devices is that they need to be deeply cleaned every day as milk fluid circulates within the heat transfer device, can deteriorate and be a source of contamination when staying longer in the device. Moreover, these systems are cleaned preferably by being rinsed using several times the amount of water they would require for a normal operation or dosing. Some other known systems use a direct flow of steam through the milk foam already formed in order to heat it up: however, this destroys the texture of the milk foam thus providing very low quality foam in cup.

It is known in the state of the art, for example as per WO 2014/077692, a disposable heat exchanger comprising a flexible coil with a product inlet and a product outlet for a perishable product, such as a milk product: a heating medium is also provided surrounding the flexible coil in order to heat the perishable product which circulates through it. This document further discloses a frothing module, preferably disposed before the product outlet in the heat exchanger for frothing the heated milk product. However, this system has the problem that the frothing is done after the milk has been heated, which therefore provides low quality milk foam. Moreover, the arrangement of the heat exchanger disclosed in this document is not compact and works with higher quantities of fluid (typically comprised between 5 and 10 liters of fluid) which makes that part of the fluid remains inside the system and can therefore be contaminated.

It is therefore an object of the invention to provide a gentle, non-destructive and powerful heating system for superior quality milk foam on demand, which is easy to operate and to maintain by a user.

SUMMARY OF THE INVENTION

According to a first aspect, the invention refers to a disposable heat transfer device for heating a fluid or a fluid foam on demand comprising a path through which the fluid or the fluid foam circulates and at least one layer made of a thermally conductive material, the path being in contact with the layer in such a way that when the layer is heated it transmits heat to the fluid or fluid foam as it circulates through the path.

Preferably, the disposable heat transfer device further comprises a first path through which steam circulates, such that the layer is heated by the change of phase of steam into liquid when circulating through the first path.

According to another embodiment, the disposable heat transfer device further comprises a second path through which steam circulates and a secondary layer in contact with the second path in such a way that the secondary layer is heated by the change of phase of steam into liquid when circulating through the second path.

Still according to another embodiment of the invention, the layer is heated by conduction and/or by radiation and/or by hot air and/or by induction.

According to the present invention, by layer it is to be understood a thin sheet of material, preferably configured as a thin foil, preferably made of a metallic material.

Preferably, the path through which the fluid or the fluid foam circulates is configured with a labyrinth shape. More preferably, the path through which fluid or fluid foam circulates and the first path and/or the second path are configured to be complementary shaped, preferably with a labyrinth shape.

According to the invention, the disposable heat transfer device further comprises a pumping and pumping and foaming device integrated in the disposable heat transfer device, such that air is also provided into it. Preferably, this pumping and foaming device comprises two parts, one moveable relative to the other (both parts can be movable or one part can be static and the other part can be movable: in both configurations, there will be a relative movement between the two parts) such that a mix of air and fluid circulates through the two parts and is subjected to shear stress allowing the foaming of the mixture of fluid and air. This foaming principle is known as Couette Flow.

According to a second aspect, the invention refers to a disposable lid or cap comprising a heat transfer device as the one previously described.

According to a third aspect, the invention refers to a pack for providing hot fluids or hot fluid foams on demand comprising in its inner volume a fluid and/or a foamable fluid product, the pack comprising a disposable lid or cap as the one previously described.

Preferably, the pack is configured as a bottle, as a pouch or as a pod, comprising a mono-dose or a multi-dose configuration, the pack being preferably configured disposable.

According to a fourth aspect, the invention further refers to a machine for heating fluids or fluid foams on demand, connectable to a pack as previously described, the machine comprising: a connection suitable for receiving the pack, in particular the lid or cap where the disposable heat transfer device is integrated and a heating unit transmitting heat to the lid or cap.

Preferably, the heating unit comprises a steam generator dispensing steam into the lid or cap.

According to another embodiment, the heating unit comprises a heating element transmitting heat to the lid or cap by conduction and/or by radiation and/or by hot air and/or by induction.

Preferably, the machine of the invention also comprises a foaming driving unit able to drive the pumping and foaming device in the lid or cap.

Still according to a fifth aspect the invention refers to a system for heating fluids or fluid foams on demand comprising a device and a pack as previously described.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which:

FIGS. 7*a-b* show schematic views of another possible configuration of the fluidic path (this time configured in a cylindrical arrangement) that can be used in a disposable heat transfer device for heating fluids or fluid foams according to a third embodiment of the present invention.

FIGS. 8*a* and 8*b* show a possible configuration of a disposable heat transfer device for heating fluids or fluid foams according to the first embodiment of the present invention, where steam heating is used.

DETAILED DESCRIPTION OF EXEMPLARY EMBODIMENTS

According to a first aspect, the present invention is directed to a disposable heat transfer device for heating fluids or fluid foams in an efficient and clean way.

Figure 1:
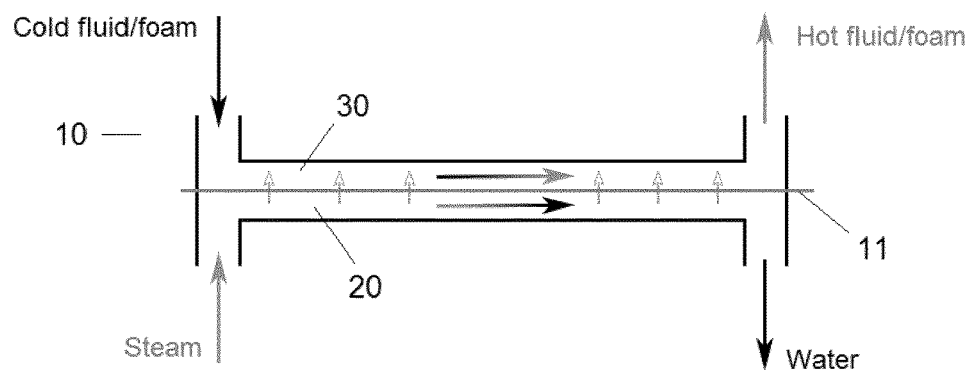
FIG. 1 shows a schematic transversal view of a disposable heat transfer device for heating fluids or fluid foams according to a first embodiment of the present invention.
Figure 4:
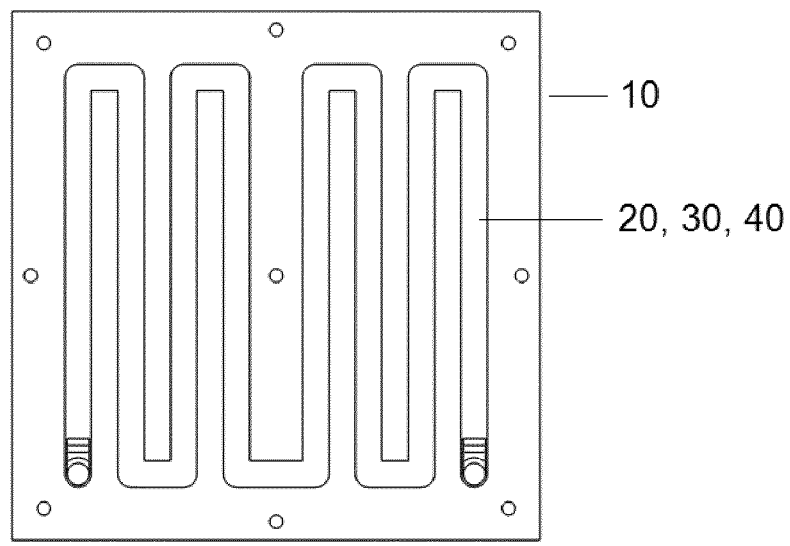
FIGS. 4-6 show schematic views of possible different configurations of the fluidic paths that can be used in a disposable heat transfer device for heating fluids or fluid foams according to the present invention.
Figure 5:
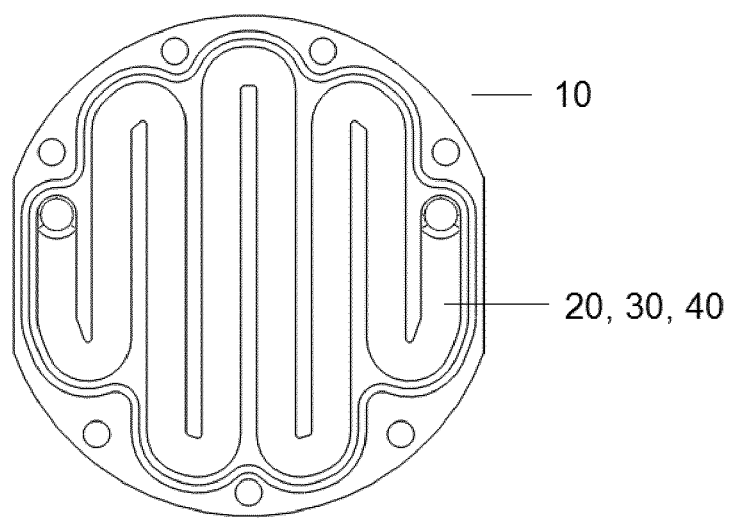
Figure 6:
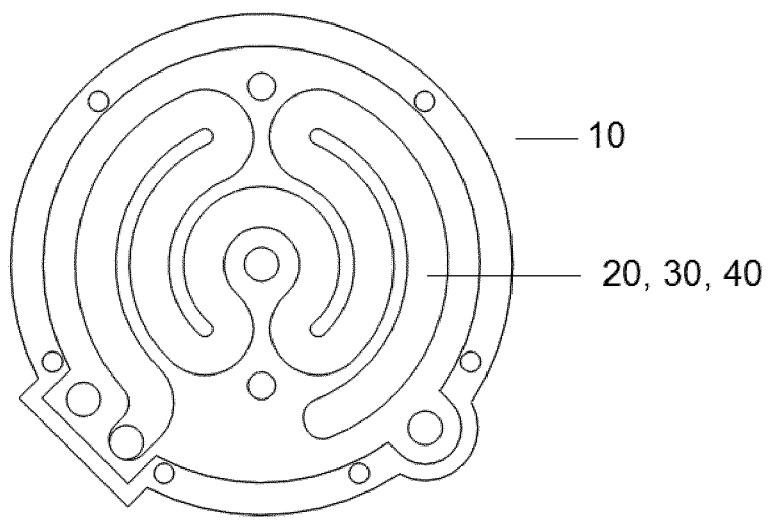

According to a first embodiment, the invention refers to a disposable heat transfer device 10 using steam, having a sandwich construction as shown schematically in FIG. 1. This construction comprises a thin layer, preferably configured as a foil and called in what follows foil 11, made of a material which is able to transmit heat (preferably a metallic material), this foil 11 being interposed between a first path 20 (preferably with the shape of a labyrinth) where hot steam circulates and a second path 30 (preferably also with the shape of a labyrinth) where a fluid (preferably a liquid, typically milk) or a foam circulates. With this configuration, heat from steam in the first path 20 is absorbed by the fluid or foam in the second path 30 by means of the foil 11, working as heat transmitter medium. The first and second paths 20, 30 preferably have the same shape so that, when they are brought together with the foil 11 in between, circulation of fluid or foam in the second path 30 matches or is confronted with circulation of steam in the first path 20 and therefore heat transfer can be optimized. Preferably, the shape or configuration of the first path 20 and that of the second path 30 is made in a labyrinth-shape type, as depicted in FIG. 4, 5 or 6. However, other complementary shapes for the first and second paths 20, 30 are also possible, as long as they ensure the correct heat transfer through the foil 11.

As described, the shapes of both paths 20 and 30 are complementary, preferably identical, at least one path having a labyrinth shape, most preferably both paths 20 and 30 having labyrinth shapes.

The labyrinth shape is a preferred shape as it allows a better heat transfer by increasing the heat transfer area between the fluid or fluid foam and the foil 11.

Figure 2:
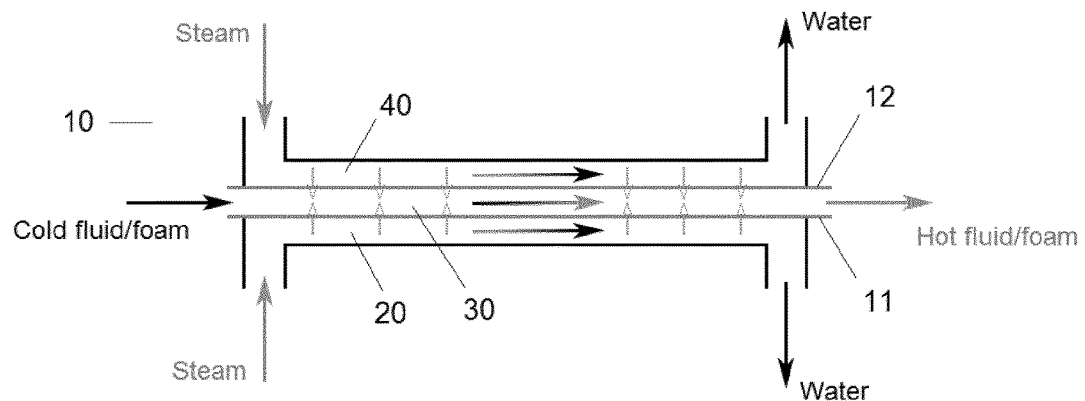
FIG. 2 shows a schematic transversal view of a disposable heat transfer device for heating fluids or fluid foams according to a second embodiment of the present invention.

According to a second embodiment, the invention refers to a disposable heat transfer device 10 using steam, having a sandwich construction as shown schematically in FIG. 2. This construction comprises a first path 20 (preferably with the shape of a labyrinth) where hot steam circulates, a primary thin layer called primary foil 11 made of a material which is able to transmit heat (preferably a metallic material), a second path 30 (preferably with the shape of a labyrinth) where a fluid (preferably a liquid, typically milk) or a foam circulates, a secondary thin layer called secondary foil 12 made of a material which is able to transmit heat (preferably a metallic material) and a third path 40 (preferably also with the shape of a labyrinth) where hot steam circulates. With this configuration, heat from steam in the first path 20 and in the third path 40 is absorbed by the liquid or foam in the second path 30 by means of the two foils, the primary foil 11 and the secondary foil 12, both working as heat transmitters. This configuration is even more efficient than the one of the first embodiment previously disclosed, as the fluid or foam absorbs heat from two steam paths (first path 20 and third path 40) at the same time.

The first, second and third paths 20, 30 and 40 preferably have the same shape (typically, a labyrinth shape) so that, when they are brought together with the primary and secondary foils 11 and 12 interposed, circulation of fluid or foam in the second path 30 matches or is confronted with circulation of steam in the first path 20 and also with circulation of steam in the third path 40; therefore heat transfer can occur very efficiently.

As described, the shapes of the paths 20, 30 and 40 are complementary, preferably identical, at least one path having a labyrinth shape, most preferably all paths 20, 30, 40 having labyrinth shapes.

The labyrinth shape is a preferred shape as it allows a better heat transfer by increasing the heat transfer area between the fluid or fluid foam and the foils 11, 12.

The disposable heat transfer device 10 according to any of the first or the second embodiment is preferably part of a disposable lid or cap which is integrated into a pack or package (preferably configured as a bottle, a pouch or a pod) comprising the fluid product that will be heated and possibly also foamed. The lid or cap so configured is preferably flat and compact. This lid or cap, integrated with the package, will be connected to a machine 200 comprising at least: a connection suitable for receiving the lid or cap (where the disposable heat transfer device 10 is integrated), a steam making unit (typically a thermoblock and a pump) and a connection for dispensing steam into the lid or cap. Further details of such a machine 200 will be explained later.

Figure 3:
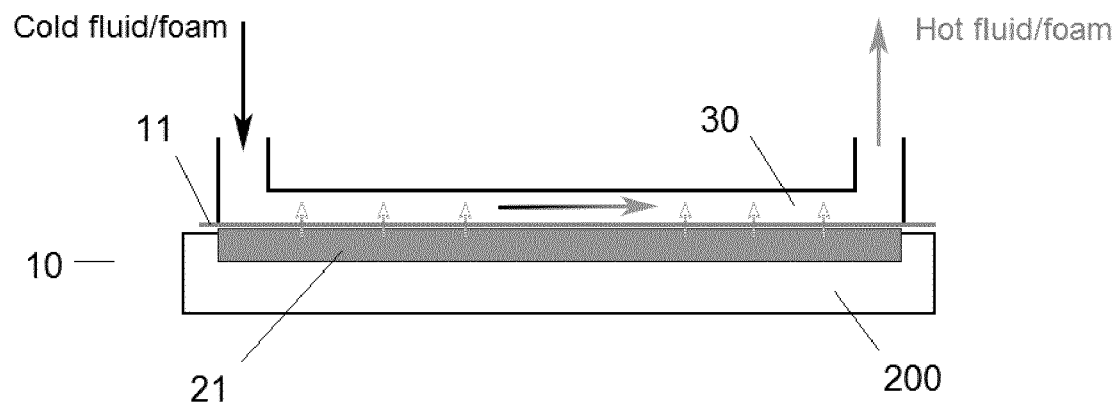
FIG. 3 shows a schematic transversal view of a disposable heat transfer device for heating fluids or fluid foams according to a third embodiment of the present invention.

According to a third embodiment, the invention refers to a disposable heat transfer device 10 preferably using conduction, having a sandwich construction as shown in FIG. 3. This construction comprises a thin layer configured as a foil 11 made of a material which is able to transmit heat (preferably a metallic material) and a path 30 (preferably with the shape of a labyrinth) where a fluid or foam circulates. When the foil 11 is heated it transmits heat to the foam or fluid circulating through the path 30. The foil 11 is heated by means of a corresponding heating element 21 arranged in the machine 200 to which the disposable heat transfer device 10 is associated, as it will be further explained. Therefore, the foil 11 works as a heat transmitter medium, as in the previous embodiments.

FIGS. 7a and 7b show an exemplary embodiment of a cylindrical arrangement that can be used for the fluidic path (i.e. for the path 30 where the fluid or foam circulates) for a disposable heat transfer device 10 according to the third embodiment of the invention. In such embodiment, the fluid or fluid foam will circulate through the path 30 in the disposable heat transfer device 10 and will be heated by a heating element 21 arranged in a corresponding machine 200. Different heating technologies can be used for the heating element 21, such as conduction, induction, hot air or radiation, amongst others.

Not only conduction but any other means able to transmit heat to the foil 11 can also be used and should therefore be comprised within the scope of protection of the present application, such as radiation using infrared or halogen lamps, hot air, induction, etc.

The arrangement disclosed for this disposable heat transfer device 10 according to the third embodiment is preferably part of a disposable lid or cap which is integrated into a pack or package (preferably a bottle, a pouch or a pod) comprising the fluid product which is to be heated and possibly also foamed. The lid or cap so configured is preferably flat and compact, thus lightweight and easily disposable. The lid or cap, integrated with the package, is connected to a machine 200 comprising at least: a mechanical connection to receive the lid or cap and a heating element 21 transmitting heat to the lid or cap (to the foil 11 in the lid or cap). Further explanation and details of the machine 200 will follow.

As previously disclosed, the first and second embodiments use steam as heating source to provide heat to the foil 11 or to the primary and secondary foils, 11 and 12. The steam transmits heat very efficiently to the foil or foils by changing phase from steam to liquid (water), allowing that the length of the path or paths decreases and, where the active surface for heating transfer is extended by using a labyrinth shape so that the lid or cap where the configuration of the invention is integrated is maintained compact. Therefore, the heating of the fluid or foam is done in direct flow, and without any contact between the machine or device and the product, thus providing an easy solution for the consumer requiring no cleaning. Water resulting from the steam phase change can be either mixed with the product (fluid or foam to be dispensed) or can be directed towards a drip tray in order to be removed at a later stage.

The approach used in the third embodiment uses a heating element 21 in the machine 200 against which the foil 11 is pressed to become hot, so that the fluid or steam becomes hot when it circulates through the path 30 in contact with the foil 11. Once again, this embodiment allows that heat is transferred to the fluid or foam without contact between the product and the machine 200, thus providing an easy solution for the consumer requiring no cleaning.

According to a second aspect, the present invention is directed to a pack for providing hot fluids or fluid foams, preferably configured as a bottle or as a pouch or as a pod, the pack comprising in its inner volume a fluid product that will be heated and possibly also foamed. The pack comprises a lid or cap into which a disposable heat transfer device 10 as previously described is integrated. The pack can be configured either as a mono-dose pack (preferably then configured as a pod) thus being used once, or as a multi-dose pack allowing a plurality of usages (in this case, the pack will preferably be configured as a bottle or as a pouch). When the pack is configured as multi-dosage, between one usage and the next, the pack can be stored in the refrigerator in a proper temperature to avoid any deterioration of the product.

According to a third aspect, the present invention is directed to a machine 200 for heating fluids or fluid foams in an efficient and clean way. The pack previously described (comprising in its inside volume a fluid product and also comprising a disposable heat transfer device 10) is connected to this machine 200. The disposable heat transfer device 10 of the invention is preferably part of a disposable lid or cap which is integrated into a pack or package comprising the fluid product, which is to be heated and possibly also foamed. This lid or cap, integrated with the package, will be connected to a machine 200.

Figure 9:
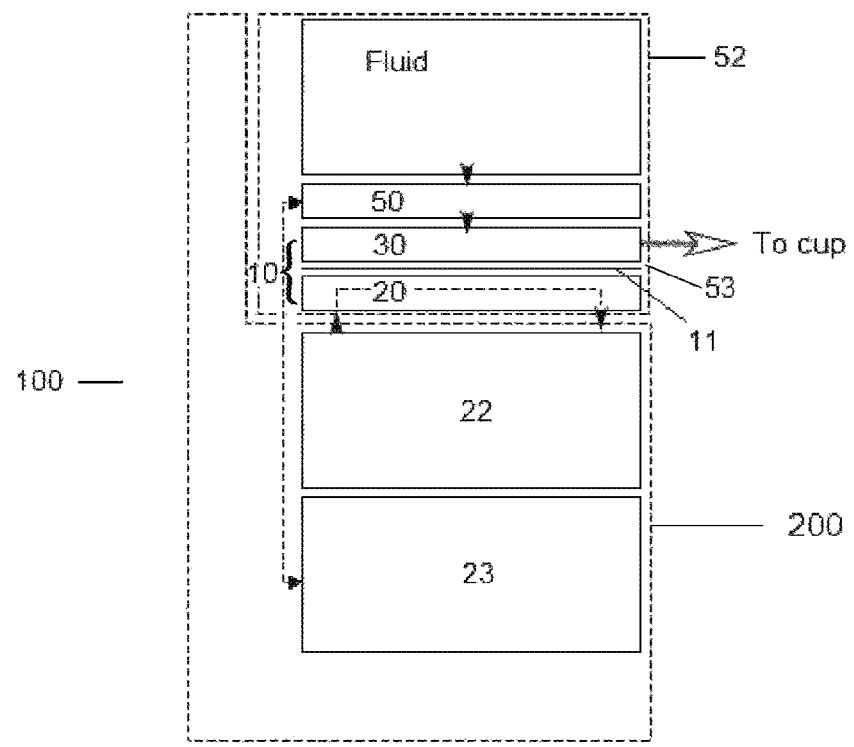
FIG. 9 shows a schematic view of a system for heating fluids or fluid foams according to the present invention, integrating a disposable heat transfer device for heating fluids or fluid foams according to the first or the second embodiment.
Figure 10:
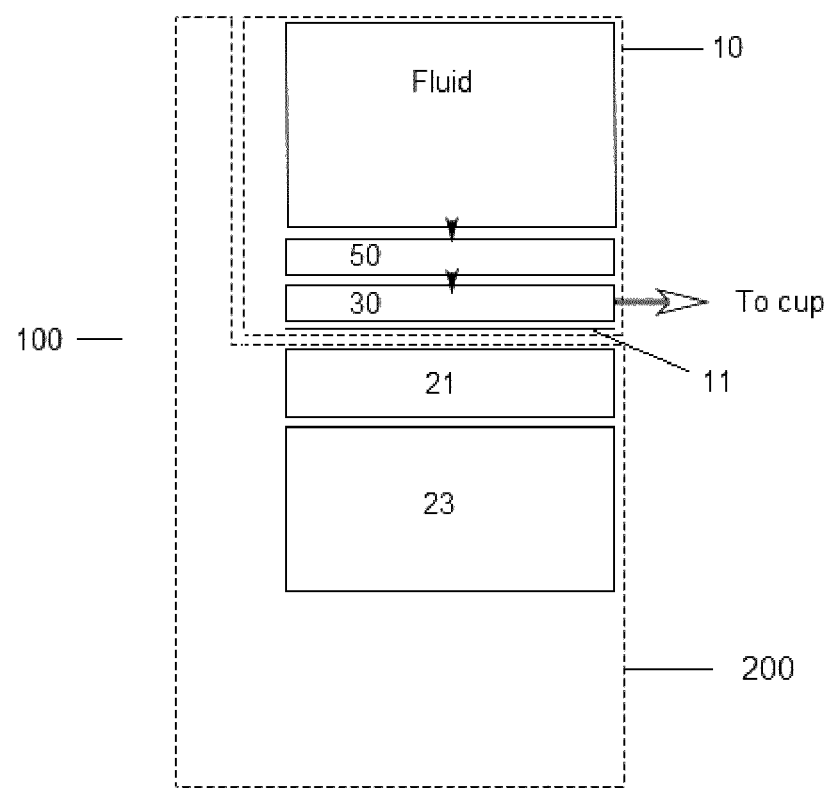
FIG. 10 shows a schematic view of a system for heating fluids or fluid foams according to the present invention, integrating a disposable heat transfer device for heating fluids or fluid foams according to the third embodiment.

As schematically shown in FIGS. 9 and 10, the machine 200 to which the pack 52 of the invention will be connected, in particular to which the lid or cap 53 of the pack 52 will be connected comprises at least:

- a mechanical connection (not shown) suitable for receiving the lid or cap where the disposable heat transfer device 10 is integrated;
- a steam generator or steam making unit 22 (typically a thermoblock and a pump) for dispensing steam into the lid or cap for the first and second embodiments using steam heating (see FIG. 9); or a heating element 21 transmitting heat from the heating element to the lid or cap, for the third embodiment using conduction, radiation with infrared or halogen lamps, hot air, induction or the like (see FIG. 10);
- optionally, a foaming driving unit 23 driving the corresponding pumping and foaming device 50 in the lid or cap to carry out foaming, and also a corresponding air entry and an air regulator (not shown) for providing air into the pumping and foaming device 50 so that a mixture of fluid (comprised in the pack) and air is foamed; according to the invention, when the air entry is not activated, the device 50 only pumps but does not foam; on the contrary, when the air entry is activated, the pumping and foaming device 50 then performs both activities, pumping and foaming.

The fluid comprised in the pack according to the invention can also have a certain flavor, so the outcome from the pack would be a flavored, hot and possibly also foamed beverage.

As represented in FIG. 9, a pack 52 according to the invention comprises in its inner volume a fluid product that will be heated and possibly also foamed and also a lid or cap 53 into which a disposable heat transfer device 10 is integrated. The whole pack 52 would be preferably made disposable according to the invention.

As schematically shown in FIG. 9, when the fluid product would be foamed it would be first directed to a pumping and foaming device 50 where a mixture of this fluid together with air provided through an air entry in the machine 200 into the pumping and foaming device 50 would be foamed. From there, the foamed mixture would be directed into the second path 30. When the fluid would not be foamed, the pumping and foaming device 50 would simply not be activated and the fluid would be directed into the second path 30. By its flow through the second path 30, the fluid or foamed fluid product would be heated by the primary foil 11 (first embodiment) or by the primary and secondary foils 11, 12 (second embodiment) and would be directed into the cup or appropriate recipient.

The machine 200 to which the pack 52 is connected comprises a steam generator 22 and a foaming driving unit 23, as shown in FIG. 9. Preferably, the pumping and foaming device 50 would be configured as a rotatable part rotating with respect to a stationary part or as two rotatable parts rotating with respect to each other, such that the mixture of air and fluid comprised between the two parts would be subjected to a shear stress that would produce foaming by Couette Flow effect. Preferably, these parts would be preferably shaped as discs or cylinders. The rotatable part (or both rotatable parts) would be driven in rotation by the foaming driving unit 23, typically a motor.

Similarly, FIG. 10 represents a pack according to the invention comprising in its inner volume a fluid product that will be heated and possibly also foamed, together with a lid or cap into which a disposable heat transfer device 10 is integrated. The whole pack would be preferably made disposable according to the invention.

As schematically shown in FIG. 10, when the fluid product would be foamed it would be first directed into a pumping and foaming device 50 where it would be mixed with air coming from an air entry in the machine 200 providing air into the pumping and foaming device 50, the mixture of fluid and air being foamed and then directed into the second path 30. When the fluid would not be foamed, the pumping and foaming device 50 would simply not be activated and the fluid would be directed into the second path 30. By its flow through the second path 30, the fluid or foamed fluid product would be heated by the foil 11 that is heated by the corresponding heating element 21 (third embodiment) and would be directed into the cup or appropriate recipient. Heating of the heating element 21 would be done by conduction, radiation using infrared or halogen lamps, hot air, induction or the like.

The machine 200 to which the pack is connected comprises a heating element 21 and a foaming driving unit 23, as shown in FIG. 10. Also preferably, the pumping and foaming device 50 would be configured as a rotatable part rotating with respect to a stationary part (it is also possible that it comprises two parts rotating with respect to each other), such that the mixture of air and fluid comprised between the two parts would be subjected to a shear stress that would produce its foaming by Couette Flow effect. Preferably, the rotatable part and the stationary part (or the two rotatable parts) would be shaped as discs or cylinders. The rotatable part (or both rotatable parts) would be driven in rotation by the foaming driving unit 23, typically a motor.

Yet according to a fourth aspect, the present invention is directed to a system 100 for providing hot fluids or fluid foams in an efficient and clean way, the system comprising a pack as previously described (the pack integrating the disposable heat transfer device 10) and a machine 200 to which the pack will be connected. Representative schematic Figures of the whole system are shown in FIGS. 9 and 10.

As it has been generally disclosed, the heat transfer device 10 of the invention and the lid or cap integrating it, is preferably made fully disposable, so no cleaning operations are needed. Typically, also the whole pack or package also integrating the heat transfer device 10 is made disposable.

Some of the advantages of the system of the invention, as already related before, are now summarized in what follows:

- the heat transfer device 10 is part of a technical cap and is fully disposable with the package (typically a bottle, a pouch or a pod);
- the fluid foam is heated very gently (thus being provided with a very high quality) as there is no direct contact between the foam and the heating source;
- the system is in-line, on direct flow and hot fluid or fluid foam can be provided on demand;
- the system is also entirely clean as there is no contact between the fluid or fluid foam and the machine (typically, the system is totally disposable);
- the system, particularly the package, are made compact, requiring less space, the lid or cap being configured lightweight, small and disposable;
- contamination is avoided as the package is made monodose or multi-dose with maximum dosing typically of 3 to 5;
- the system, particularly the heat transfer device 10, is made very efficient so the dimensions can be minimized and the paths where the fluid or fluid foam circulates are made shorter, thus the pack is made more compact.

Although the present invention has been described with reference to preferred embodiments thereof, many modifications and alterations may be made by a person having ordinary skill in the art without departing from the scope of this invention which is defined by the appended claims.

LIST OF REFERENCES

100 Fluid or fluid foam heating system
  10 Disposable heat transfer device
    11 Primary foil
    12 Secondary foil
    20 First path
    30 Second path
    40 Third path
    50 Pumping and foaming device
200 Machine
  21 Heating element 22 Steam generator
23 Foaming driving unit

The invention claimed is:

1. A system comprising a machine for heating a fluid or fluid foam on demand, the system further comprising a pack comprising a fluid product in an inner volume of the pack, the pack comprising a disposable lid or cap, wherein a heat transfer device is disposed within the disposable lid or cap for heating the fluid or fluid foam on demand, the heat transfer device comprising a first path defining a first plane through which steam circulates, the heat transfer device further comprising a second path defining a second plane through which the fluid or fluid foam circulates, the second plane is parallel to the first plane, the heat transfer device comprising at least one layer made of a thermally conductive material that is sandwiched in between the first path and the second path, the second path being in contact with the at least one layer in such a way that when the at least one layer is heated, the at least one layer transmits heat to the fluid or fluid foam as the fluid or fluid foam circulates through the second path, such that the at least one layer is heated by a change of phase of the steam into liquid when the steam is circulating through the first path, the machine comprising a connection configured for receiving the pack, and a heating unit comprises a steam generator disposed within the machine that is configure for transmitting and dispensing steam to the disposable lid or cap such that the steam is circulating through the first path, and a foaming driving unit comprises a motor disposed within the machine that is configured to rotate a rotatable part of a pumping and foaming device in the disposable lid or cap such that the fluid or fluid foam is circulating through the second path.

2. The system according to claim 1, wherein the connection is configured for receiving the disposable lid or cap.

* * * * *